Feb. 17, 1942.      H. R. CRANE      2,273,347
DUMBBELL-JOINT PRESSURE-LINE SCRAPER
Filed April 19, 1940

INVENTOR,
H. R. Crane;
By his attorney,
Frederick E. Maynard.

UNITED STATES PATENT OFFICE 2,273,347

DUMBBELL-JOINT PRESSURE-LINE SCRAPER

Hubert R. Crane, Los Angeles, Calif.

Application April 19, 1940, Serial No. 330,585

2 Claims. (Cl. 15—104.06)

This invention is a link or chain type of scraper for water pressure propulsion in the bore of divers tubular installations, for instance in the bores of water, gas, oil or sewer pipe, or pipe lines for other industrial services.

An object is to provide a pipe line scraper involving a series of sections or tool members which are connected on their axes only by a series of coaxial, dumb-bell links having a shank length designed to provide for an unrestrained to and fro or axial shift of the contiguous ends of the tool members to which they are attached for freedom of action of the train of members, for their free rotation as to each other and as to the connecting links and especially for the very abrupt bending of the whole train to facilitate passage of the scraper as an assembly along short-radius bends in the pipe lines to be cleaned. The unrestrained bending of the axis of the scraper is of great advantage because it permits each tool member to work its way unhampered either by limiting attachment to other elements and enables each tool member to drop ahead freely to a limited degree, under control of the dumb-bell joint when the assembly is on a steep down pitch pipe line section or is making a vertical drop in a bore.

The Sweeny Patent 323,972, of 1885, shows a series of scraper devices which are held in definite, contracted position by a yieldable axial spinal hitch means: the scraper blades cannot shift axially without restraint as is intended and accomplished by the instant invention.

Another object of this invention is the provision of a train of scraper tool members which are not entrained as one assembly from end to end by a limiting hitch to which all members are related but any number of the said members may be coupled by end links one to the next to make a short or long train related only by the links slackly uniting contiguous members of pairs.

The Patent 500,467, to Bliss, of 1893, shows a series of end-abutted sections B capable of tumbling endwise on each other to make bends in a pipe but there is not shown in Bliss a desired axial freedom of movement between the members B as is provided by the objects and structure of the instant invention, which is distinctive by the individual slack joint link means coupling pairs of the members.

The invention consists in certain improvements in this art as set forth in the ensuing description and disclosure and having, with the above, additional objects and advantages as hereinafter developed, and whose constructions, combinations, and details of means, and the manner of operation will be made manifest in the specification of the herewith illustrative embodiment; it being understood that modifications, variations and adaptations may be resorted to within the scope, spirit and principle of the invention as it is more particularly claimed hereinbelow.

Figure 1:
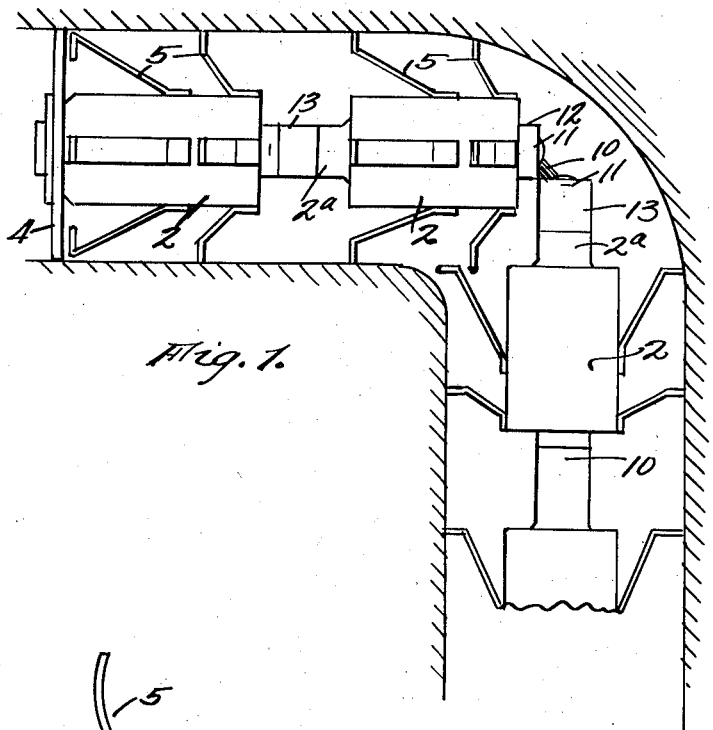
Figure 1 is side elevation of the scraper as in operation, turning a short bend in a pipe line.

The scraper as a whole is made up of a suitable number of body members 2 of any suitable and appropriate structural form, for instance as cylindric, hollow castings with closed end walls 3 and of a size to well clear a given size pipe bore to be scraped and allow for the flow of such liquid as may be in or supplied to the pipe. One or more of the members 2 may have attached to an end a stiff but flexible piston disc 4 of a size to slidably fit a given bore to be scraped so that a stream of liquid may act propulsively to drive the scraper assembly before the head of flowing liquid.

As many of the body members 2 as may be desired is provided with any suitable and approved arrangement of flexible scraping teeth 5 projecting radially from the periphery of such members to firmly but yieldably scrape the bore surface of the pipe; each member having teeth 5 longitudinally spaced thereon to afford a means to normally sustain each member alone substantially concentric in the pipe bore without need of other centering device.

Many pipe lines have very short radius bends in their lengths and it is very desirable to provide a flexible train of scraper members which are so interconnected that the members may easily and quickly negotiate such bends in the traverse of the pipe in the least hampered or restrained manner possible. For instance it is a desideratum that the leading member of the train may have an entirely free axial and free lateral deflection as to its next member, and indeed it is desirable that each and every member may have at some time or other its own free shift and deflection without an effect or effort on other members in the train.

This desideratum is secured in this invention by the provision of a connecting means which is distinctly limited to the immediate coupling of the contiguous ends of a given pair of the scraper members 2. A preferred form of this connector consists of a stout link 10 of the shape of a dumbbell either or both of whose balls 11 are of attachable form to be screwed or riveted onto the shank of the link after the latter has been coupled into suitable end seats. One such seat 12 is in the form of a bushing to screw into the near end head on one member 2, Fig. 2, and the other seat 13 is in the form of a nipple to screw onto a reduced stem 2a of the next member 2 of a pair.

Figure 2:
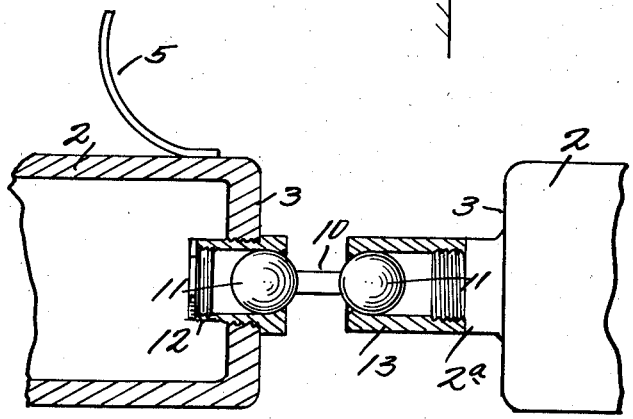
Figure 2 is an axial, sectional detail of a pair of the scraper members, and their dumb-bell link or coupler.

The reduced stem 2a provides for the short flexing of the coupled train of members 2 as is shown in Fig. 2 without interference of the bodies thereof. The length of the rigid shank of the dumbbell link determines the limit to which near members 2 may move apart axially or laterally without restraint in the train. An advantage of the direct connection of pairs of the members 2 is that should any one link break in the train that part of the broken train could be recovered which is connected to such pulling line or cable as may be used on the water head side of the train. In structures where the train of sections is joined by an axial cable as in Bliss, supra, if the cable breaks all of the members are left in the bore line to be fished out one at a time.

It will be seen that by the present coupler each of the members is freely turnable on its dumbbell link 10, each can tilt on the ball of its link, and all of the said members are free to move axially to a limited degree, as in Fig. 2.

Where needed very short trains of only two or three members 2 can be easily made up in given cases of use.

What is claimed is:

1. A pressure line scraper including a pair of body members provided with radially directed scraping blades and axially disposed means for connecting said members including a dumbbell link; one of said members having a coaxial, projecting end hub in which one ball is mounted and the other member having opposite to the said hub an attached bushing receiving the other ball of the link and limiting outward movement of the ball therein; the hub and the bushing being of about equal end-face diameter so that at a 90 degree bend the corners of the hubs will fulcrum one on the other; the balls of said link being freely slidable and freely rotatable in the hubs and the bar of the link being of such length as to enable a right-angle position between said bodies relatively at any relative rotative position of the bodies on their axes.

2. The device of claim 1, the hubs of the bodies being of such length as to provide right angle position of the bodies without interference.

HUBERT R. CRANE.